United States Patent
Ogden et al.

(10) Patent No.: US 9,593,031 B1
(45) Date of Patent: Mar. 14, 2017

(54) CHLORINE GENERATOR

(71) Applicants: Jeffrey A. Ogden, West Milton, OH (US); Sidney Ogden, West Milton, OH (US)

(72) Inventors: Jeffrey A. Ogden, West Milton, OH (US); Sidney Ogden, West Milton, OH (US)

(*) Notice: Subject to any disclaimer, the term of this patent is extended or adjusted under 35 U.S.C. 154(b) by 22 days.

(21) Appl. No.: 14/824,661

(22) Filed: Aug. 12, 2015

(51) Int. Cl.
C25B 1/02 (2006.01)
C25B 1/12 (2006.01)
C25D 17/00 (2006.01)
C25D 7/00 (2006.01)
C02F 1/461 (2006.01)

(52) U.S. Cl.
CPC .......... *C02F 1/461* (2013.01); *C02F 1/46109* (2013.01); *C02F 2201/4612* (2013.01); *C02F 2201/4618* (2013.01)

(58) Field of Classification Search
CPC .......... C25D 17/00; C25C 7/00; C25C 7/007; C25B 1/02–1/12
USPC .................. 204/271; 205/628–632
See application file for complete search history.

(56) References Cited

U.S. PATENT DOCUMENTS

| | | | |
|---|---|---|---|
| 6,942,766 B2 * | 9/2005 | Lemke ............... | C02F 1/46104 204/242 |
| 8,114,258 B2 * | 2/2012 | Huber ................. | C25C 3/02 204/194 |
| 8,636,881 B2 * | 1/2014 | May ................... | C25B 9/00 204/193 |

OTHER PUBLICATIONS

"Journal of Civil Defense", vol. 41 Issue 3, (Summer 2008), 22 pgs.
"Journal of Civil Defense", vol. 43 Issue 3, (Fall/Winter 2008), 26 pgs.

* cited by examiner

*Primary Examiner* — Zulmariam Mendez
(74) *Attorney, Agent, or Firm* — Schwegman Lundberg & Woessner, P.A.

(57) ABSTRACT

Embodiments disclosed herein include a generator for making hypochlorite from chloride salts and water. The generator includes an anode comprising a translucent tube coupled to a color coded electrode that terminates in a connector, having a chamfered tip, for connecting with a power source; and a cathode comprising a translucent tube coupled to a color coded electrode that terminates in a connector, having a chamfered tip, for connecting with a power source.

7 Claims, 8 Drawing Sheets

CHLORINE GENERATOR

FIELD

Inventive subject matter disclosed herein relates to a chlorine generator and to embodiments for disinfecting surfaces and liquids under adverse conditions.

BACKGROUND

Chlorine gas is expensive and difficult to transport and store. Materials such as hypochlorite, in an aqueous medium, have a short half life with decreasing potency over time. The electrolytic reaction of brine is as follows:

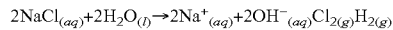

$$2NaCl_{(aq)} + 2H_2O_{(l)} \rightarrow 2Na^+_{(aq)} + 2OH^-_{(aq)} Cl_{2(g)} H_{2(g)}$$

SUMMARY

Embodiments disclosed herein include a generator for making hypochlorite from chloride salts and water. The generator includes an anode comprising a translucent tube coupled to a color coded electrode that terminates in a connector, having a chamfered tip, for connecting with a power source; and a cathode comprising a translucent tube coupled to a color coded electrode that terminates in a connector, having a chamfered tip, for connecting with a power source. The generator also includes an indicator positioned within at least one of the anode or cathode for indicating the extent of making hypochlorite. The generator further includes a coupler, having an X-shape, comprising inlets for receiving the translucent tubes from each of the anode and cathode and positioned so that the translucent tubes form a V-shape, and opposing inlets for receiving anode and cathode elements, respectfully. The generator additionally includes a power source comprising one or more couplers for supplying power to the generator; a tripod for positioning the anode and cathode; and a bracket for dissipating of heat mounted on the tripod.

DRAWINGS

DETAILED DESCRIPTION

The following detailed description includes references to embodiments, which are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the inventive subject matter is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The chlorine generator disclosed herein provides point-of-use generation of sodium hypochlorite and other oxidants from basic salts and DC power via a portable, batch generating device. The generator, one embodiment of which is illustrated at 10 in FIG. 1, includes a pair of electrodes 11A and 11B that include translucent tubes 12A and 12B, respectively, that each terminate at an electrode end 14A and 14B, respectively. The electrodes 11A and 11B are an anode and a cathode, respectively. The anode and cathode include a marking or color difference for clearly delineating cathode from anode to avoid reversing polarity, as shown for one embodiment in FIG. 5. The speed of the reaction is determined by the amount of DC current applied to the generator. The greater the current, the faster the reaction.

The generator embodiments disclosed herein require no expensive batteries or pumps or control circuits or sensors or indicator lights or switches or printed circuit boards. The generator embodiments are easily scalable for a variety of batch sizes by varying pipe diameter or length or both. Generator embodiments are usable in areas where there is no active power grid.

The translucent tubes 12A and 12B are made of either glass or ceramic or plastic. The tubes 12A and 12B allow visual inspection by a user to verify that the tubes have been loaded correctly prior to initiating an electrolysis reaction. Visual inspection of the tubes is also used to determine when reaction is completed. A visual determination of fluid displacement in the tubes 12A and 12B is used to determine when the electrolytic reaction is completed.

Figure 1:
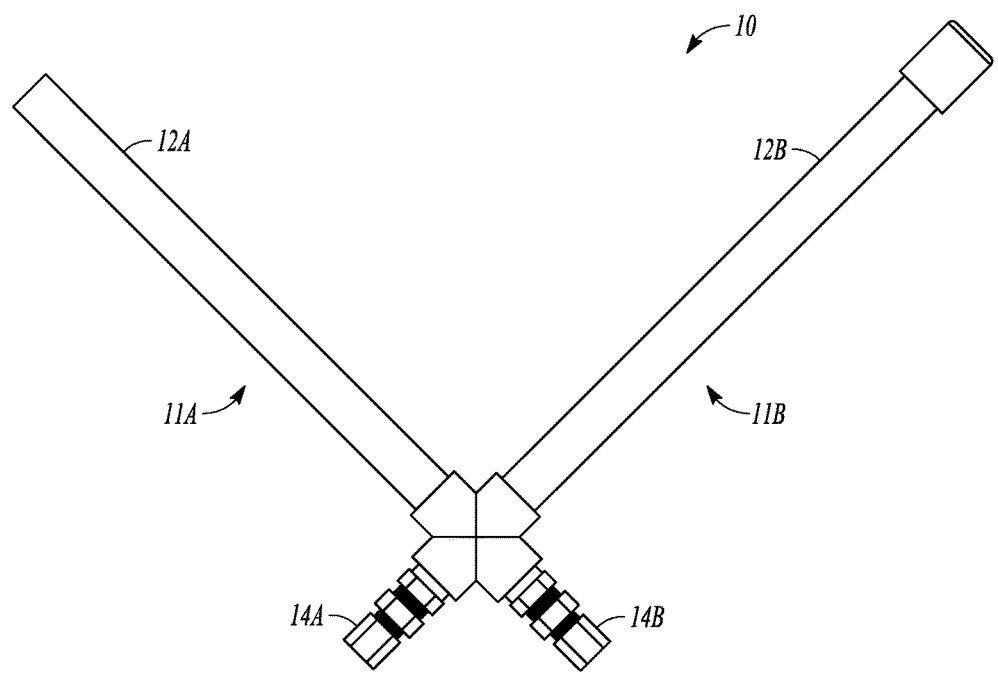
FIG. 1 illustrates a top plan view of one V-shaped embodiment of the chlorine generator of the present invention.

While a V-shape is shown in FIG. 1 for the positioning of the tubes and electrodes, generator embodiments disclosed herein include X-shape, H-shape, U-shape or flexible tubing with electrodes separated and positioned at a bottom of the generator allowing separate gasses produced by the anode and cathode to be captured in separate chambers positioned proximal to the electrodes. One of the electrodes is capped, shown at 16 and the other electrode is open, shown at 18, not capped.

The generator 10 is scalable to accommodate batch sizes of hypochlorite required by the end user. Size embodiments range from small portable generators for individual use up to large, truck mounted generators for producing large quantities of hypochlorite. However, the generator is not a hand-held device, to avoid solution from bubbling over a user of the generator. The generator 10 produces hypochlorite through a batch flow process and not a continuous flow process.

The generator 10 requires no control circuitry for controlling a DC power source, such as a battery, solar generator or DC converter. One generator embodiment is powered by a solar generator, such as a solar panel, thereby avoiding the cost and hassle of batteries. The generator 10 does not include semi-permeable membranes to separate various gasses produced during the chemical reaction. Electrodes 14A and 14B are replaceable, serviceable and cleanable in the field without tools or special equipment.

The electrodes 14A and 14B are carbon/graphite based and are tapered or chamfered in order to concentrate and improve power flow. Copper electrodes are not employed in the generator 10 because of the tendency of copper to corrode and leak. The generator 10 does not include catalysis materials such as platinum and titanium.

Figure 2:
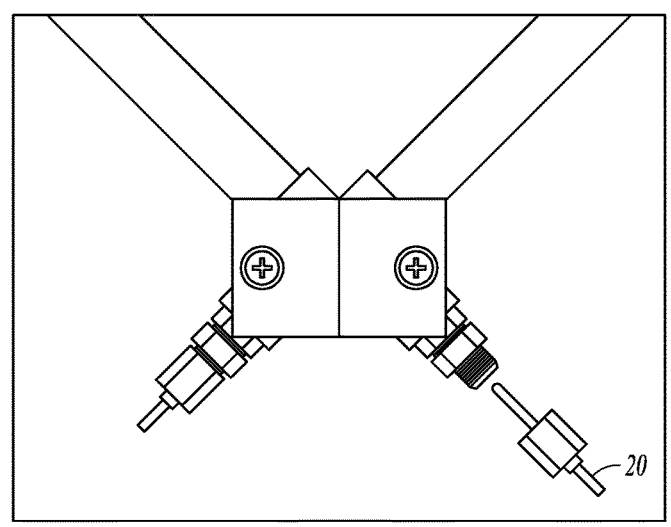
FIG. 2 illustrates a top plan view of connectors for connecting electrodes of the chlorine generator to a power source.

Electrodes 14A and 14B have an exposed connector for connection to a power source, as shown at 20 in FIG. 2. Electrodes 14A and 14B are sealed to prevent oxidant solution from leaking from the generator. Power cables 22 connected to the externally exposed electrodes are illustrated in FIGS. 3 and 4.

Figure 3:
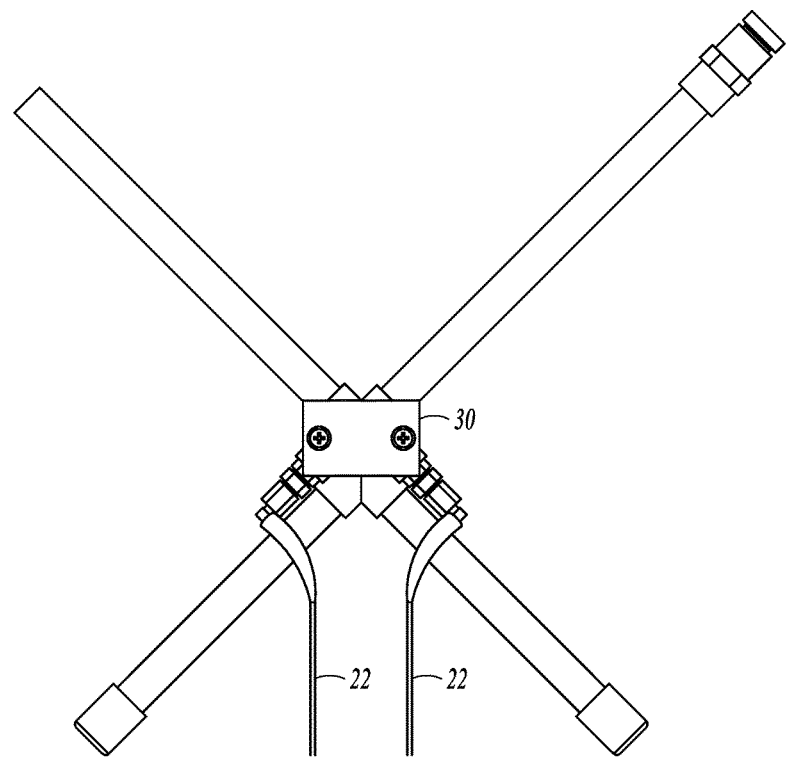
FIG. 3 illustrates a perspective view of the V-shaped chlorine generator, mounted on a tripod, with power cables connected to externally exposed electrodes.
Figure 4:
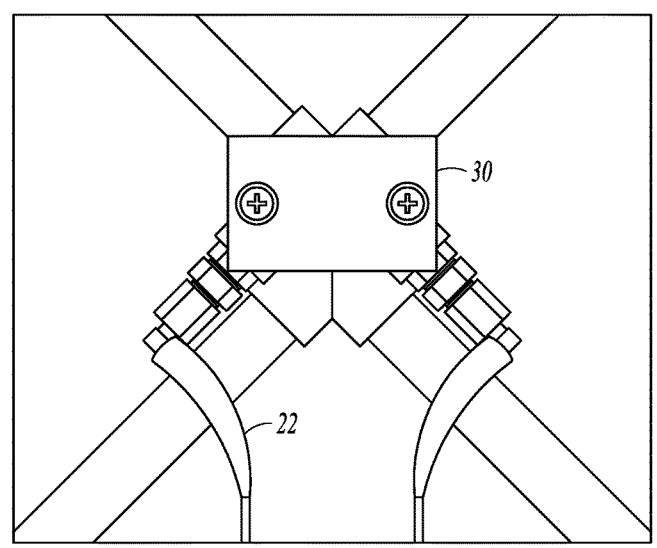
FIG. 4 illustrates a perspective view of the power cables and electrodes of FIG. 3.
Figure 6:
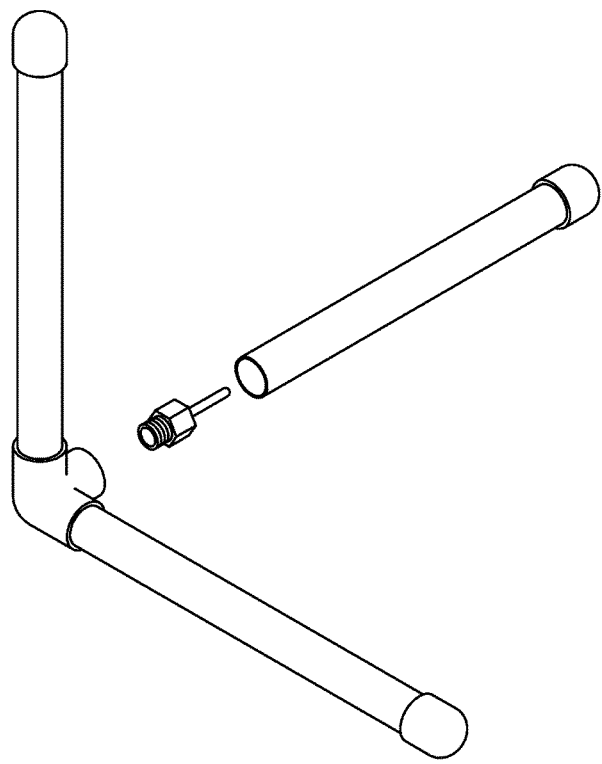
FIG. 6 illustrates a perspective view of a storage compartment inside one of the legs of the tripod shown in FIG. 3.
Figure 7:
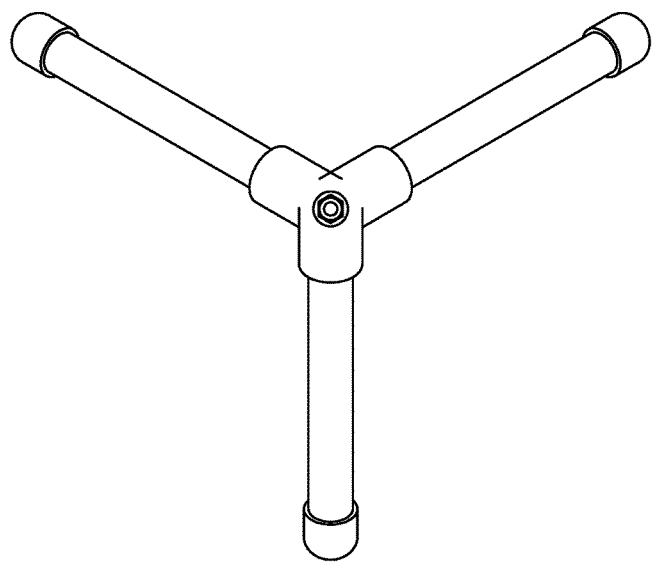
FIG. 7 illustrates a top perspective view of the tripod of FIG. 3.

Embodiments of the generator 10 include a tripod stand, shown at 24 in FIGS. 3 and 4, and at 24 in FIG. 7. For some embodiments shown in FIG. 6, legs of the tripod are made of PVC, are hollow and are usable for storing spare electrodes, cleaning and maintenance supplies and spare salt. Other embodiments do not include a stand but may be hung from trees or objects using rope, straps, twine, vines, and so forth during operation.

Figure 5:
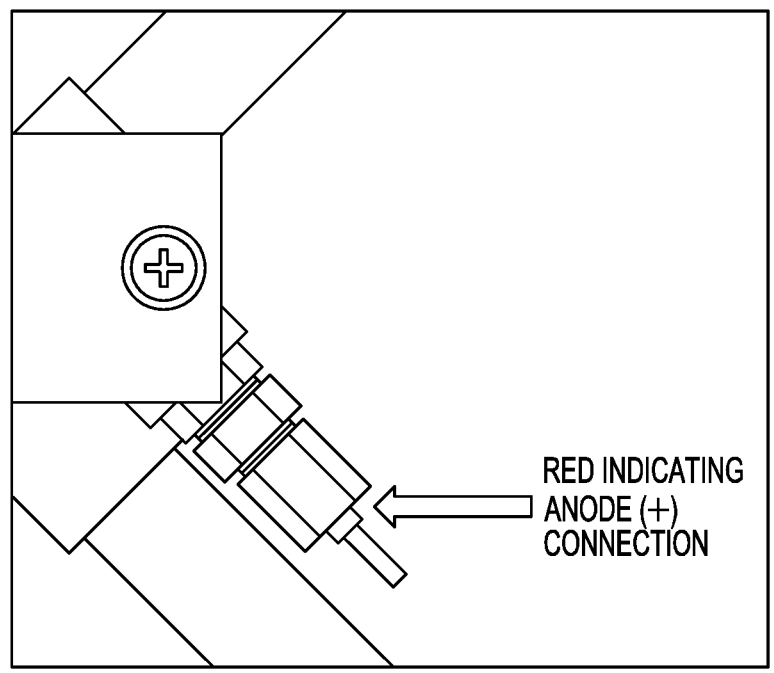
FIG. 5 illustrates a perspective view of an anode connection of the generator embodiment of FIG. 1.
Figure 7A:
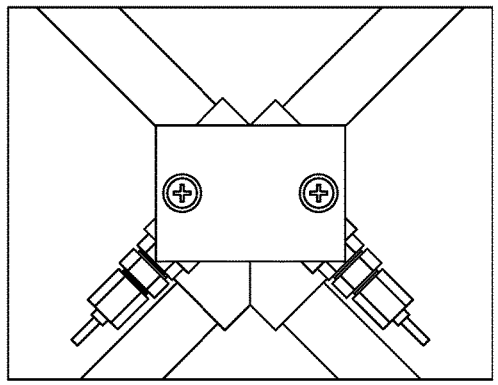
FIG. 7A illustrates a front plan view of a cooling bracket mounted on the tripod of FIG. 7.
Figure 7B:
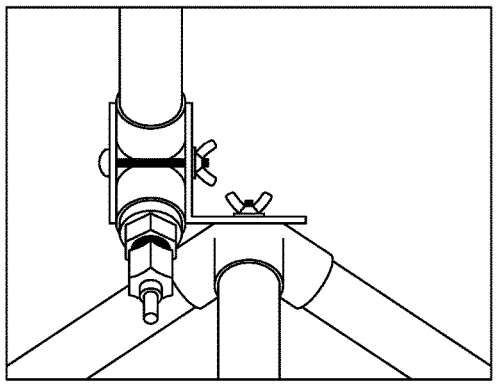
FIG. 7B illustrates a side perspective view of the cooling bracket of FIG. 7A.
Figure 7C:
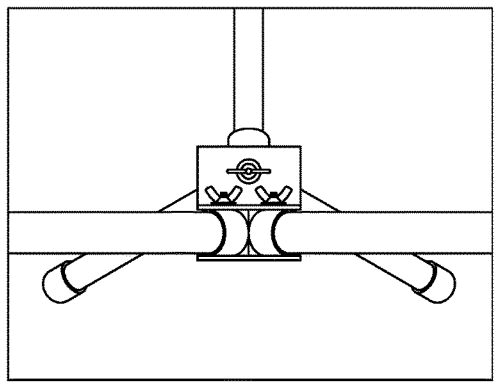
FIG. 7C illustrates a top view of the cooling bracket of FIG. 7A.
Figure 7D:
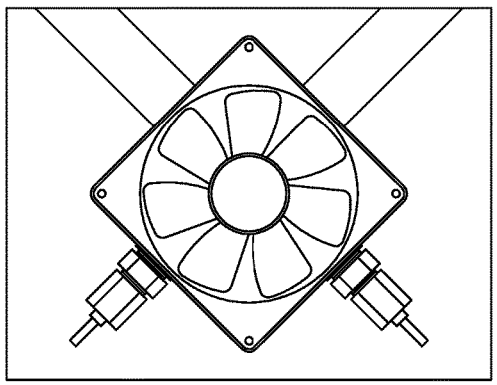
FIG. 7D illustrates a top plan view of a fan mount for the cooling bracket of FIG. 7A.

Adding more current to the electrodes produces a faster reaction, but also produces more heat of reaction. When polymeric materials are used in the generator, heat must be dissipated to cool the device. In one embodiment, heat is dissipated through an aluminum mounting bracket, shown at 30 in FIGS. 3 and 4. Other views of the bracket are shown in FIGS. 7A, 7B and 7C. While aluminum is described, it is understood that other heat conducting materials are usable for the bracket. It has surprisingly been found that minimal contact between the bracket and electrodes, such as shown in FIGS. 4 and 5, is sufficient to cool the generator over a range of reaction rates. For some embodiments, cooling fans are mounted to the generator with the bracket 30, as shown in FIG. 7D.

Figure 8:
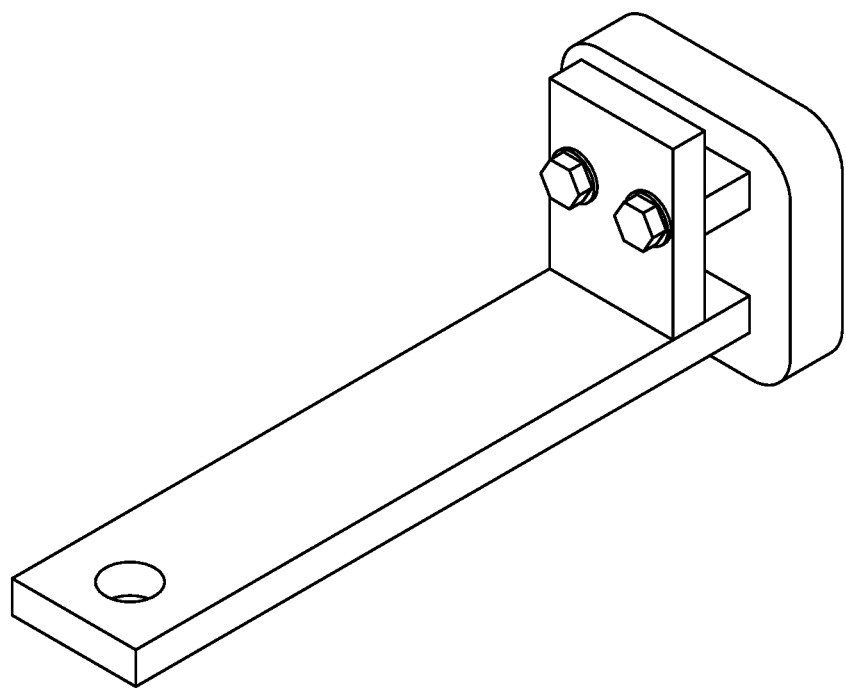
FIG. 8 illustrates a perspective view of a cooling bracket incorporated into a trailer hitch mount bracket.

For some embodiments, the bracket 30 is incorporated into a trailer hitch mount bracket, shown in FIG. 8, to use the weight of a vehicle to support the larger and heavier device while in use.

Figure 9A:
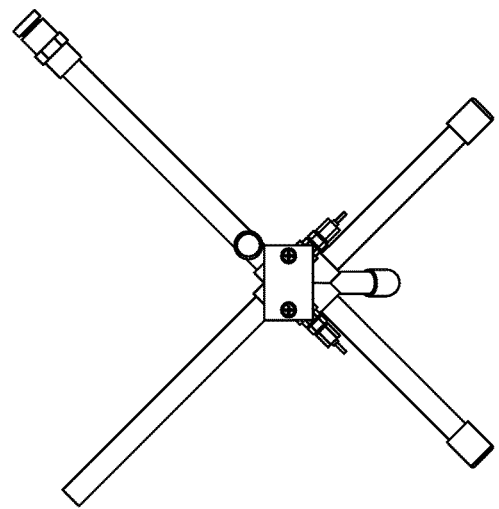
FIG. 9A illustrates the V-shaped generator of FIG. 1, mounted on the tripod of FIG. 7, with a floating ball showing the degree of chemical reaction at the beginning of a reaction.
Figure 9B:
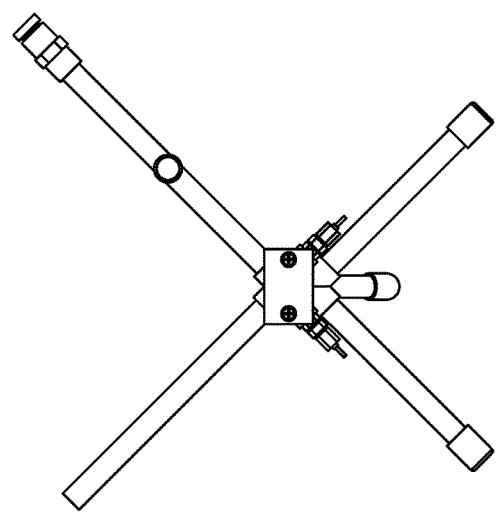
FIG. 9B illustrates the V-shaped generator of FIG. 1, mounted on the tripod of FIG. 7, with a floating ball showing the degree of chemical reaction at a mid-point of a reaction.
Figure 9C:
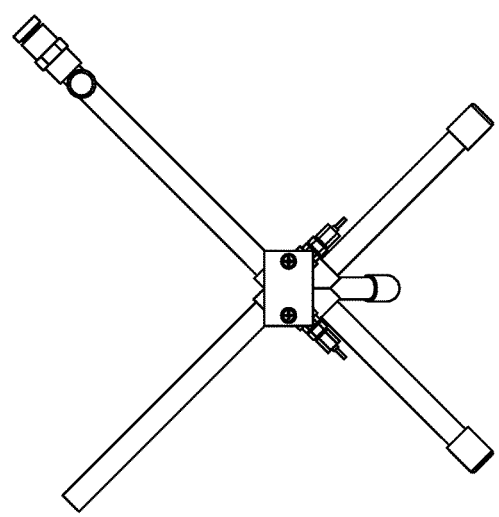
FIG. 9C illustrates the V-shaped generator of FIG. 1, mounted on the tripod of FIG. 7, with a floating ball showing the degree of chemical reaction at the end of a reaction.

For some embodiments, a user views the liquid level of salt solution in the generator. For other embodiments, floating balls or dye are added to the electrolyte solution tube (capped side) to enable a user to visually determine reaction completion from a distance. Floating ball(s) are retained in the capped tube using a perforated disk at the bottom of the capped tube. FIG. 9A shows the electrolyte level, denoted by the position of the ball, at the beginning of the reaction; FIG. 9B shows the position of the ball in the middle of the reaction. FIG. 9C shows the position of the ball at the reaction conclusion.

The operation of the generator 10 is manual. A user mixes salt, NaCl or KCl into water in a container until the water can dissolve no more salt and undissolved salt remains in the bottom of the container, to make a saturated salt solution. The saturated salt solution is poured into the open tube 12A of the generator. Saturated solution is added until the tube with the cap, 12B, is filled with saturated solution. Excess saturated solution is poured out by rotating the capped tube. This ensures that only the capped tube has the salt solution in it, thereby ensuring that the correct amount of saturated solution has been loaded into the generator. The generator is then returned to a V-position, such as is shown in FIG. 1. The salt solution remains in the capped tube.

For some embodiments, the generator is attached to the tripod or is suspended from an overhead structure to maintain the V-orientation during operation. For embodiments that include a floating ball, the ball is in the position shown in FIG. 9A The DC power source is connected to the electrodes to begin the reaction. The positive power cable is connected to the capped side of the generator in the current embodiment. As the reaction continues, the chlorine gas produced at eh anode rises in the capped tube and displaces the salt solution, moving the floating ball downward, shown in FIG. 9B. Once the floating ball and corresponding solution level in the capped tube reaches the bottom of the generator, the reaction is complete and the maximum amount of sodium hypochlorite has been produced.

The hypochloride solution is then poured out of the generator for use in purification, sterilization or is returned to the capped tube, by tipping the generator, for increasing the concentration of hypochlorite by another batch run.

Figure 10:
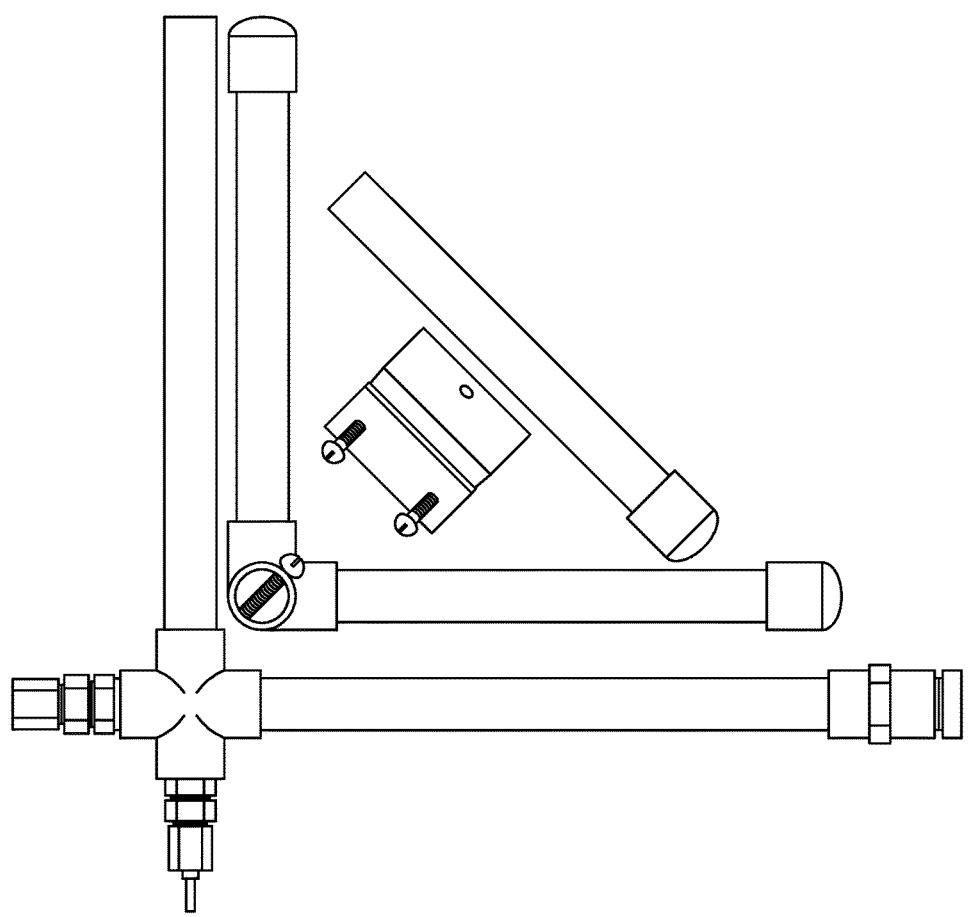
FIG. 10 illustrates the components of the V-shaped generator of FIG. 1 and tripod of FIG. 7.
Figure 11:
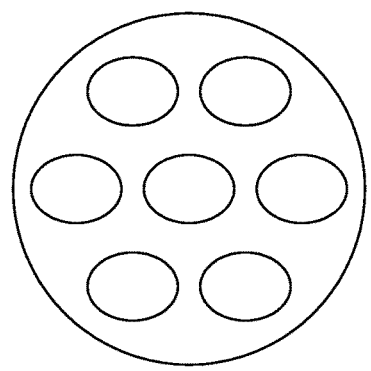
FIG. 11 illustrates a burp plate component of the V-shaped generator.

The generator can be taken apart for cleaning or storage or shipping as sown in FIG. 10. The generator includes quick disconnect fittings. For some embodiments, flexible clear tubing is used to reduce the size of the generator.

The generator enables a user to halt or pause a reaction without losing progress of a batch. For instance, if a solar panel is used to supply electricity and is shut down by a cloud or nightfall, the user may restart the reaction when sunlight is available without starting over. Furthermore, the reaction does not need to be constantly monitored.

The generator withstands electromagnetic pulses because there are no complex control circuits, printed circuit boards, sensors, indicator lights, pumps, or switches being used. The oxidant solution obtained from the batch process is usable for water purification, laundry purposes, weed and vegetation killer, mildew remover, equipment sterilization, chemical weapon, disinfectant, and so forth.

Concentration of hypochlorite in the oxidant solution is increased by repeatedly subjecting it to the batch process. One embodiment of the generator produces a hypochlorite solution having a concentration of five ppm chlorine when added to a fifty gallon drum of water of a 250 ppm solution when added to one gallon of water.

All components of the generator are easily inspectable, cleanable and replaceable. The generator is cleaned using a bottle brush or similar device to remove hard water deposits. A vinegar solution is usable to clean the generator.

For some embodiments, the generator is usable to capture and utilize hydrogen at the cathode in addition to or instead of capturing chlorine generated at the anode of the generator.

The generator does not require pumps to move fluids. Instead, the generator utilizes gravity and pressure created during the electrolysis process. When the reaction is completed, the reaction product is poured out of the device. The dual clear tube design enables a user to view solution moving inside the device while pouring to avoid spills.

Larger embodiments of the generator include a "burp plate" to retain fluid in the angled pipe during the transition into a V-position after the addition of the saline solution. The "burp plate" is a chemically inert perforated plastic or ceramic disk that allows the gas produced by the anode to still enter the capped tube but helps keep the saline solution from flowing out of the capped tube while transitioning to the V-position before beginning the reaction. The "burp plate" is positioned directly above the anode chamber.

The embodiments are described in sufficient detail to enable those skilled in the art to practice the invention. Other embodiments may be utilized and formulation and method of using changes may be made without departing from the scope of the invention. The detailed description is not to be taken in a limiting sense, and the scope of the invention is defined only by the appended claims, along with the full scope of equivalents to which such claims are entitled.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the present description

What is claimed is:

1. A generator for making hypochlorite from chloride salts and water, the generator comprising:
   an anode comprising a translucent tube coupled to a color coded electrode that terminates in a connector, having a chamfered tip, for connecting with a power source;
   a cathode comprising a translucent tube coupled to a color coded electrode that terminates in a connector, having a chamfered tip, for connecting with a power source;
   an indicator positioned within at least one of the anode or cathode for indicating the extent of making hypochlorite;
   a coupler, having an X-shape, comprising inlets for receiving the translucent tubes from each of the anode and cathode and positioned so that the translucent tubes form a V-shape, and opposing inlets for receiving anode and cathode elements, respectfully;
   a power source comprising one or more couplers for supplying power to the generator;
   a tripod for positioning the anode and cathode; and
   a bracket for dissipating of heat mounted on the tripod.

2. The generator of claim 1 wherein tips of the anode and cathode are tapered or chamfered.

3. The generator of claim 1 wherein anode and cathode are free from copper.

4. The generator of claim 1, wherein the indicator is a floating ball.

5. The generator of claim 1, further comprising a burp plate.

6. The generator of claim 1, wherein the anode and cathode are color coded.

7. The generator of claim 1, wherein components are connected with quick-disconnect fittings.

\* \* \* \* \*